Nov. 24, 1953                K. F. JOHNSON ET AL                2,660,218
                                WELDING APPARATUS
Filed April 2, 1948                                          3 Sheets-Sheet 1
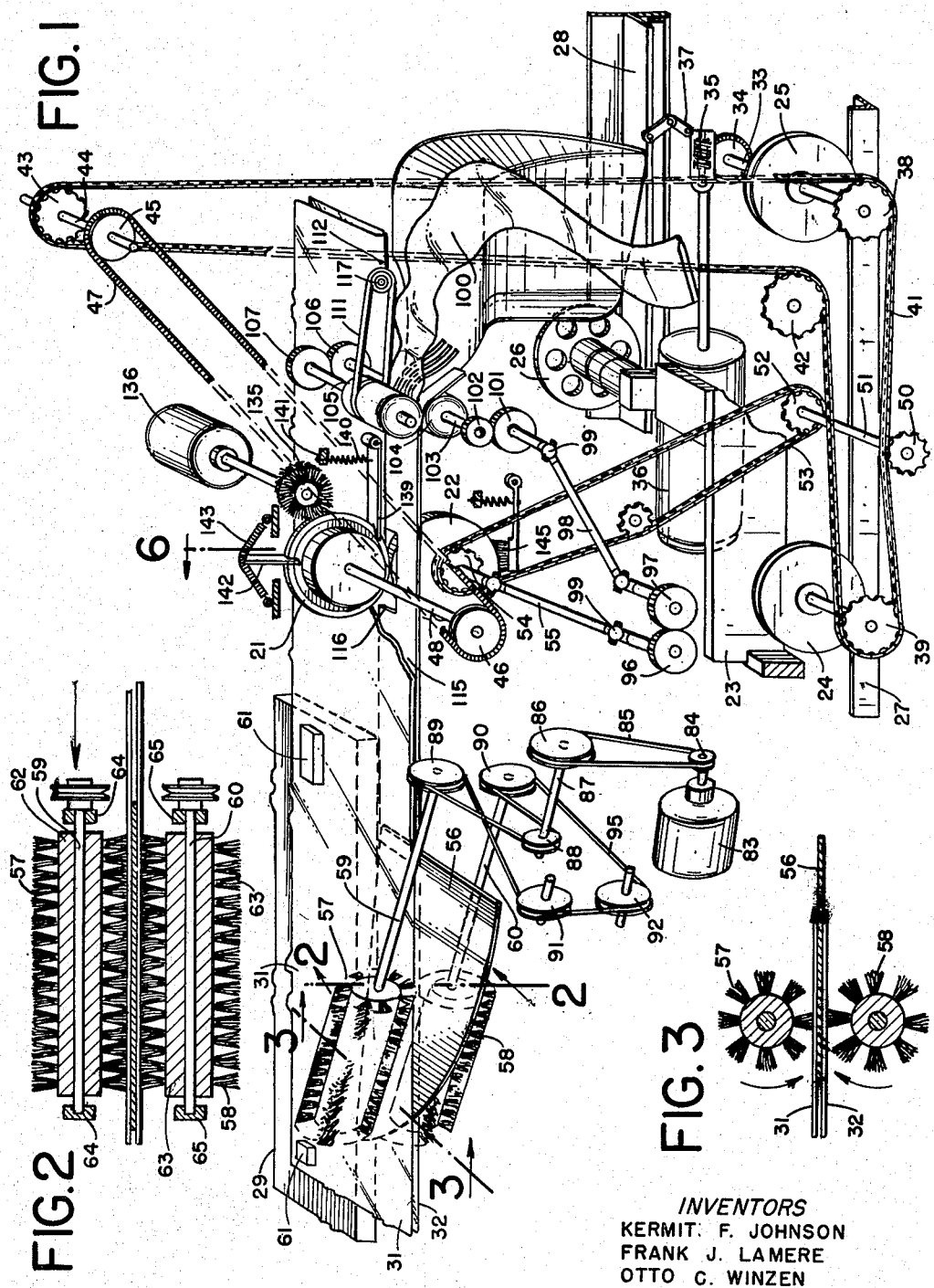
INVENTORS
KERMIT F. JOHNSON
FRANK J. LAMERE
OTTO C. WINZEN
BY William C. Babcock
                    ATTORNEY Nov. 24, 1953    K. F. JOHNSON ET AL    2,660,218
WELDING APPARATUS
Filed April 2, 1948    3 Sheets-Sheet 2
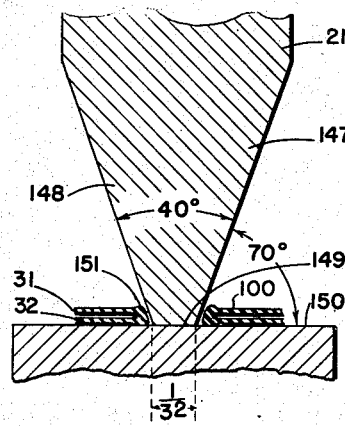
FIG. II
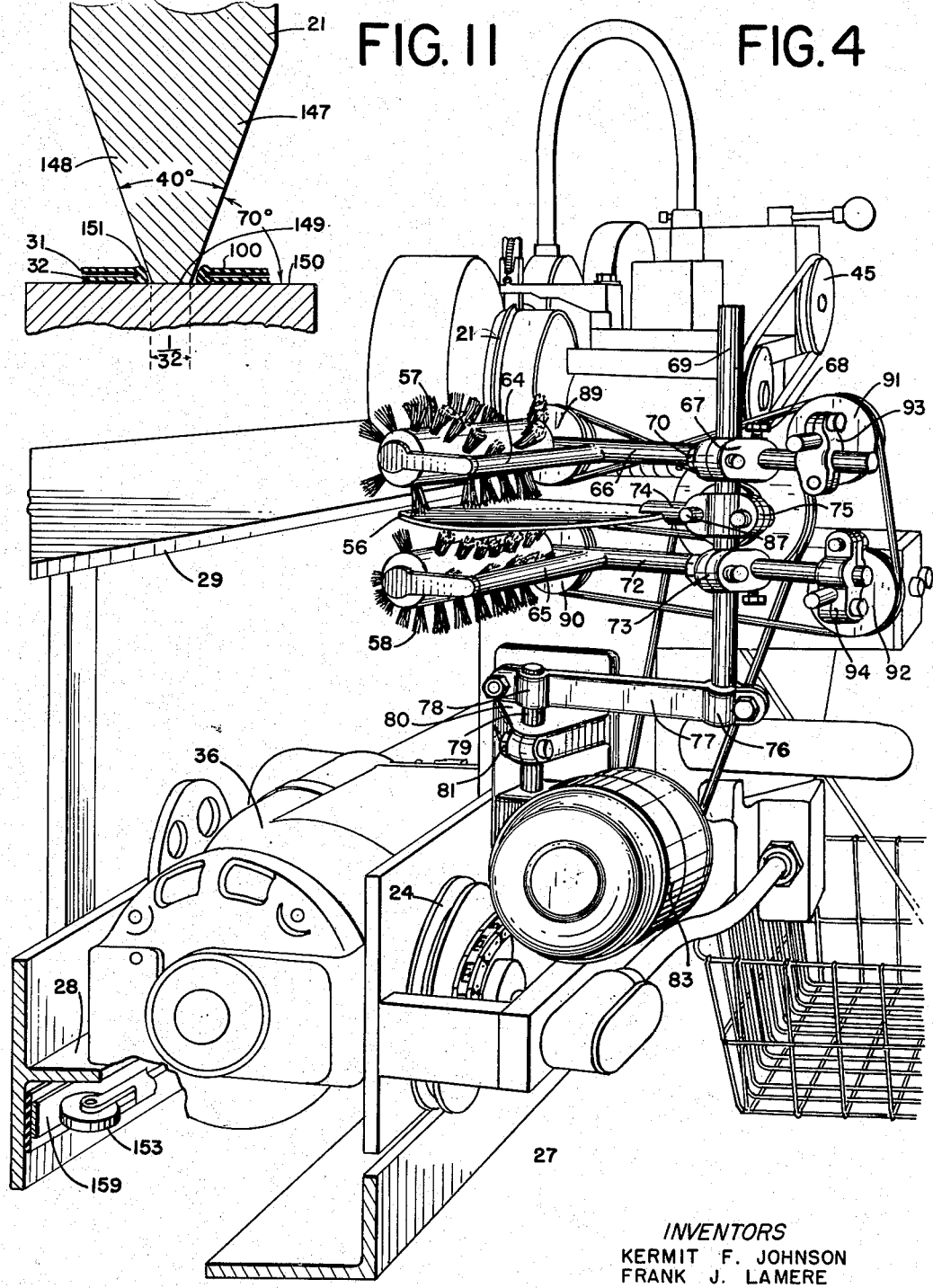
FIG. 4
INVENTORS
KERMIT F. JOHNSON
FRANK J. LAMERE
OTTO C. WINZEN
BY William C. Babcock
ATTORNEY Nov. 24, 1953    K. F. JOHNSON ET AL    2,660,218
WELDING APPARATUS Filed April 2, 1948    3 Sheets-Sheet 3

INVENTORS
KERMIT F. JOHNSON
FRANK J. LAMERE
OTTO C. WINZEN
BY *William C. Babcock*
ATTORNEY Patented Nov. 24, 1953

2,660,218

UNITED STATES PATENT OFFICE 2,660,218

WELDING APPARATUS

Kermit F. Johnson, Frank J. La Mere, and Otto C. Winzen, Minneapolis, Minn., assignors to General Mills, Inc., a corporation of Delaware Application April 2, 1948, Serial No. 18,584

21 Claims. (Cl. 154—42)

This application relates to apparatus for welding sheets of thermoplastic material and more particularly to such an apparatus in which the material is cut to the desired size and shape as it is welded.

It is one object of the invention to provide apparatus for simultaneously cutting and welding superimposed sheets of thermoplastic material.

Another object is the provision of such apparatus in which a single pair of combination cutting and welding rollers is employed.

An additional object is to provide combination cutting and welding rollers of more efficient shape and dimensions.

A further object is to provide such apparatus with new and improved tensioning means for stretching the material smoothly in advance of the welding rollers.

Another object is a welding apparatus in which improved feed rollers are provided to pull the material away from the welding rollers.

Still another object is the provision of a welding apparatus in which the welding unit is supported on a movable carriage which travels past the material to be welded while said material remains stationary.

A further object is to provide such an apparatus in which rotatable tensioning brushes engage the material ahead of the welding rollers and in which the position of said brushes is adjustable for use with various speeds of travel of the device.

Another object is the provision of improved cleaning means for welding rollers in such an apparatus.

Other objects and advantages of the invention will be apparent from the following specification in which a detailed description of a preferred embodiment has been given, with particular reference to the accompanying drawings in which:

Figure 1 is a perspective schematic view of the elements of one embodiment of the invention.

Fig. 2 is a sectional view on the line 2—2 of Fig. 1.

Fig. 3 is a sectional view on the line 3—3 of Fig. 1.

Fig. 4 is a perspective view of the forward portions of the apparatus showing details of the adjustable mounting for the tensioning means.

Fig. 11 is a sectional view on the line 11—11 of Fig. 10.

Figure 5:
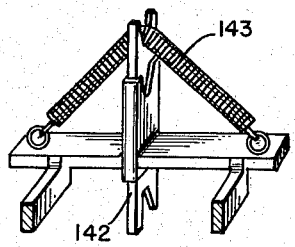
Fig. 5 is a partial perspective view showing details of an improved cleaning means according to the invention.
Figure 6:
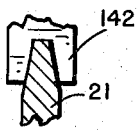
Fig. 6 is a partial sectional view on the line 6 of Fig. 1 showing further details of the cleaning means.

As shown in Fig. 1 the device includes a heated welding roller 21 which cooperates with an unheated anvil roller 22. These rollers are suitably mounted on shafts carried by portions of a suitable frame 23. To simplify the figure, only a portion of the frame has been shown. This frame 23 is provided with supporting wheels 24, 25, and 26, the first two of which are on one side of the machine and the other of which supports the opposite side of the frame and machine. Wheels 24 and 25 are notched and are adapted to travel on track 27 while wheel 26 is supported on a separate track 28. Tracks 27 and 28 are stationary and may constitute part of the supporting frame of a suitable table 29 on which the sheets of material 31 and 32 which are to be welded may be placed.

Wheel 25 is attached to a shaft 33 which carries a worm gear 34. This gear is driven by a worm 35 connected to the operating shaft of a motor 36 mounted in frame 23. A suitable clutch mechanism for disengagement of the worm 35 has been designated schematically by the linkage 37 and may be utilized to disengage the worm 35 from gear 34 to stop the machine.

Shaft 33 also carries a sprocket 38 which drives a similar sprocket 39 connected to wheel 24 by means of a chain 41. Thus, both the wheels 24 and 25 will be driven when clutch 37 is engaged. Thus the heat-sealing apparatus carried by frame 23 will be driven along the tracks 27 and 28 to weld the material as the machine travels along.

Chain 41 is engaged by a suitable idler sprocket 42 and drives a further sprocket 43 on shaft 44 near the top of the machine. A pulley 45 on shaft 44 is connected to a similar pulley 46 by a belt 47. Pulley 46 in turn is mounted on the shaft 48 which carries the heated welding roller 21. By suitable choice of the sprocket and pulley sizes and the diameter of the welding roll and supporting wheels, the speed of rotation of the welding roller 21 may be coordinated with the speed at which frame 23 moves along table 29 so that any desired relative speed may be obtained between the periphery of the welding roller 21 and the material to be welded.

Chain 41 also drives another sprocket 50 on shaft 51. Sprocket 52 on shaft 51 carries a chain 53 which drives a further sprocket 54 on shaft 55 which carries the anvil roller 22. Here again, the size of the sprockets and the diameter of the anvil are coordinated to achieve the desired relative speed between the surface of the anvil roller 21 and the material. In most cases, it is preferred that there be no relative movement between the welding and anvil rollers and the material as the frame 23 travels past the material. In other words, the anvil and welding rollers move at a speed so that they roll along the material being welded at the same speed as the frame 23 is moved so that there is no slippage or pulling between the rollers and the material but merely a rolling compressive action during the welding operation.

To assist in tensioning the material in advance of the welding roller, a guide or separating plate 56 has been provided which is positioned between the two sheets 31 and 32 to be welded. Rotating tensioning members in the form of brushes 57 and 58 are mounted above and below the plate respectively and serve to brush the respective layers of material against the plate and in a direction away from table 29. Thus after the material is properly aligned with table 29 and is held on said table in a manner to resist lateral movement transversely of the direction of travel of the unit (e. g. by weights 61), the brushes and separating plate will serve to pull it outwardly in smooth flat condition and tension the material sufficiently to facilitate the welding action. As described below, the brushes 57 and 58 may be angularly mounted with respect to the direction of travel of the welding unit (i. e., the longitudinal axis of the machine), or with respect to the transverse axis of the device, or with respect to both said axes.

These brushes are carried by shafts 59 and 60 respectively. The brushes themselves are set in cylindrical hubs 62 and 63 in known manner and these hubs are carried by shafts 59 and 60. The shafts are journaled in U-shaped bearing members 64 and 65 best shown in Fig. 4. Bearing 64 has a rod-like extension 66 which is mounted in a suitable clamp 67 and may be adjusted longitudinally thereof by use of the clamping screw 68. Clamp 67 in turn is mounted on vertical supporting rod 69 and may be adjusted vertically thereof by means of clamp screw 70.

Bearing 65 for the lower brush 58 likewise has an extension 72 mounted in a similar clamping member 73. Thus the respective brushes may be adjusted horizontally toward and from the table 29 and may also be adjusted vertically as desired. Separating plate 56 is carried by a rod 74 mounted in a similarly adjustable bracket 75. It should be noted that these brackets are not only vertically and laterally adjustable as indicated above but that they also permit angular adjustment of the axis of the brushes with respect to the direction of travel of the machine. Thus, any desired tensioning action may be obtained for a given speed of travel of the machine.

Vertically supporting rod 69 is mounted in a clamp 76 at one end of a horizontal supporting arm 77. The other end of arm 77 is adjustably clamped at 78 to a vertical shaft 79 journaled in a bearing member 80 on the frame of the welding unit. A clamping screw 81 permits adjustment of shaft 79 and thus permits the operator to shift the support 69 longitudinally of the sealing unit to space the brushes 57 and 58 at whatever distance ahead of the welding rollers is desired. The mechanism described above makes possible any adjustment of the brushes vertically, laterally, longitudinally, and angularly. In general we prefer to locate the brushes with their axes angularly disposed with respect to both the longitudinal and transverse axes of the machine. However, it is clear that the brush axes may be adjusted parallel to either of said machine axes if desired.

To drive the brushes a separate motor 83 is provided, said motor being mounted on the frame of the welding unit. The drive pulley 84 of the motor (Fig. 1) is connected by a belt 85 to a pulley 86 on intermediate drive shaft 87. A further pulley 88 on shaft 87 is connected to pulleys 89 and 90 on the brush shafts 59 and 60 respectively by means of a belt 95 which passes over suitable idler pulleys 91 and 92. In the arrangement shown in Figs. 1 and 4, the pulley arrangement is such that the motor remains in fixed position while the brushes are adjustable as described. Intermediate drive shaft 87 is mounted in the bracket 75 (Fig. 4) which also supports plate 56. Idler pulleys 92 are mounted on shafts carried in brackets 93 and 94 which are adjustably clamped on the rods 66 and 72 of the brush supports (Fig. 4).

Figure 7:
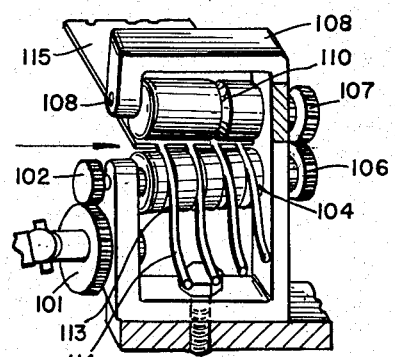
Fig. 7 is a perspective view taken from the rear, showing details of the feed rollers of the apparatus.
Figure 8:
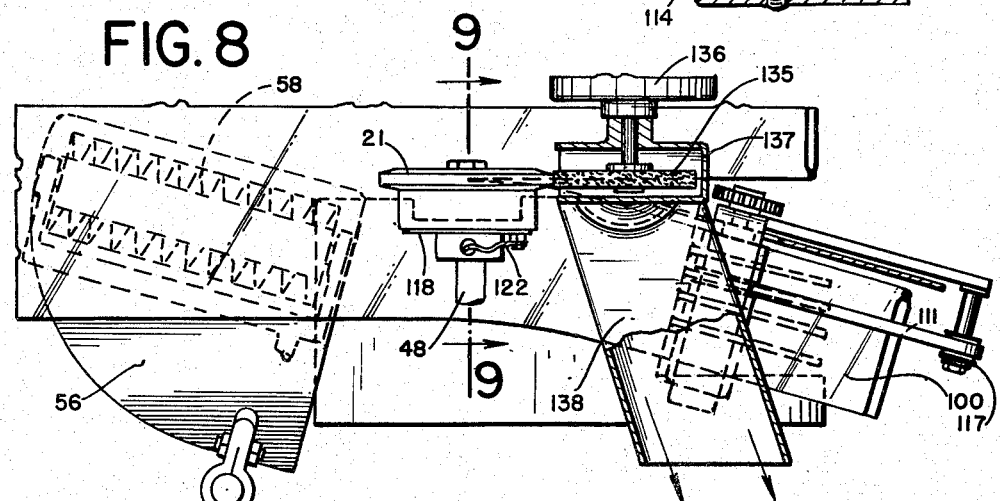
Fig. 8 is a partial top plan showing the relation of the welding rollers, forward tensioning means, and rear feed rollers.

In order to tension the material behind the welding rollers 21 and 22 and to assist in pulling the material past said rollers, feed rollers 104 and 105 are provided (Figs. 1, 7 and 8). These rollers are driven as follows:

A gear 96 on shaft 55 drives a similar gear 97 on a shaft 98 which is connected in turn to a shaft 103 by means of gears 101 and 102 on the respective shafts. Universal joints 99 are provided in shafts 95 and 98. Shaft 103 carries a lower feed roller 104 which cooperates with an upper feed roller 105. Gears 106 and 107 on the shafts of the respective feed rolls connect the rollers together so that they will be rotated at the proper speed to assist in pulling the material back through the welding rollers and holding the material flat during the operation of said welding rollers. We prefer to drive these feed rollers at a slightly greater peripheral speed than the welding rollers in order to tension the material and pull it cleanly away from the welding rollers.

Rollers 104 and 105 are journaled in a suitable frame portion 108 as shown in Fig. 7. As indicated in this figure, the axes of the rollers are not quite parallel. Thus the rollers are farther apart at the end 109 than at their opposite end. In other words, the axes converge toward the seam 112 made by the welding rolls. While this axial separation has been exaggerated in Fig. 7, it is a desirable feature of the apparatus because it facilitates the edgewise insertion of the cut strip of material 100 as the apparatus first begins to move along table 29 and starts the cutting of sheets 31 and 32.

Upper feed roller 105 is provided with a groove 110 in which a feed belt 111 (Fig. 1) is carried. The other end of this feed belt passes over an idler roll 117 mounted in the frame. The lower run of belt 111 engages the excess material 100 which has been cut off at seam 112 and prevents the excess material from winding around the upper feed roller 103.

The lower roller 104 is provided with a series of peripheral grooves 113 (Fig. 7) which are deep enough to accommodate the guide fingers 114 formed as extensions on the plate 115 which supports the outer edges of the sheets 31 and 32 during the welding operation. The presence of these guide fingers 114 prevents the cut strip of material 100 from winding around the lower feed roller 104 and thus guides the strip into a suitable chute or collecting basket.

Supporting plate 115 extends forwardly ahead of the welding rollers as shown in Fig. 1 and includes a cut-out portion 116 which permits the rollers 21 and 22 to engage the material.

As shown in Fig. 8, the feed rollers 103 and 104 are angularly mounted with respect to the axis of the welding roller (i. e., the transverse axis of the machine). Thus, these rollers assist in separating the strip 100 from the main body of sheets 31 and 32, by pulling the strip outwardly at an angle away from seam 112. This action of the feed rollers also assists in tensioning the sheets behind the welding rollers and thus co-operates with the action of brushes 57 and 58 to hold the material under proper tension for the welding operation.

Figure 9:
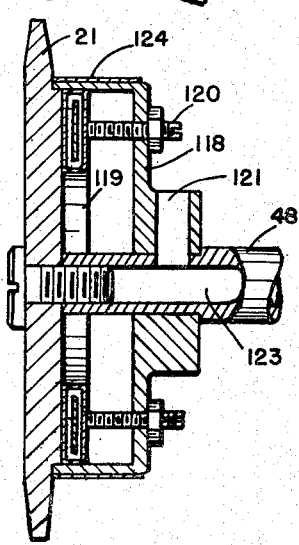
Fig. 9 is a sectional view on the line 9—9 of Fig. 8.
Figure 10:
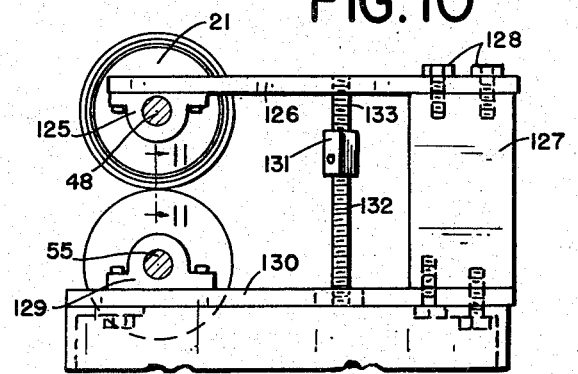
Fig. 10 is a partial view showing details of the mounting of the welding roller.

The heated welding roller 21 is provided with a housing 118 best shown in Fig. 9. Inside this housing a suitable annular flat heating element 111 is clamped against the face of the welding roller by screws 120. An opening 121 in the hub of the roller housing permits the passage of wires 122 (Fig. 8) from the heating element terminals into the hollow bore 123 of shaft 48. These wires are then led to suitable commutator rings (not shown) through which current is introduced into the heating unit. To insulate the housing 118 and prevent the material from sticking to the hot periphery of the housing, one or more layers of glass insulating tape 124 may be wound around the periphery as shown in Fig. 9.

To support the shaft 48 of welding roller 21, a bearing bracket 125 is carried at the end of a resilient metal supporting arm 126. Arm 126 is fastened to the frame at 127 by bolts 128.

A similar bracket 129 supports shaft 55 for the lower welding roller 22 and this bearing bracket 129 is fixedly mounted on supporting plate 130 fastened to the frame of the unit. A turnbuckle 131 has lower and upper threaded portions 132 and 133 which engage the plate 130 and the arm 126, respectively. Thus, adjustment of turnbuckle 131 will urge the shaft 48 toward or away from the shaft 55 so as to produce any desired pressure between the welding rollers.

In order to clean the heated welding roller, a rotary brush 135 is provided (Figs. 1 and 9). This brush is driven by a separate motor 136. A suitable housing 137 surrounds the brush 135 and guides the particles of material which are removed from the welding roller 22 away from the machine by means of a chute 138. The use of a separate motor 136 is considered desirable in order that the cleaning action may continue at all times regardless of starting or stopping of the machine. Brush 135 engages the periphery of roller 21 after the roller has engaged the material and thus cleans the roller continuously during the welding operation.

A stripping member is provided in the form of a scraper 139 pivoted to the main frame and resiliently held against rolls 21 by a spring 140 fastened to the frame at 141. This scraper 139 engages the periphery of the roll just behind the point of welding contact between rolls 21 and 22. Thus the scraper will strip the material away from heated roller 21 in case a particular portion of the material tends to stick to the roller. We have found that this stripping action is surprisingly efficient if the scraper 139 is made of a polymer of tetrafluoroethylene. Such polymers have been sold commercially under the trade name "Teflon."

A coating scraper 142 is mounted at the top of the welding roller and serves to coat the roller with a thin film after the roller passes the cleaning brush 135 and before the roller engages the material to be welded. This scraper 142 is resiliently urged against the periphery of roller 121 by a spring 143 as shown in Fig. 5. Scraper 142 is also made of a tetrafluoroethylene polymer. We have found that this material can be deposited in a thin film on welding roll 21 from the scraper. This thin film in turn helps prevent pieces of the thermoplastic sheet material from sticking to the roller, and thus keeps the roller clean and makes possible more uniform welding temperatures at the periphery of the roller.

A resiliently mounted brush 145 engages the periphery of the lower roller 22 and keeps this roller clean at all times. Since roller 22 is unheated, the additional cleaning devices used with roller 21 are unnecessary, but may be used if desired.

With reference to Fig. 11, we have found that the shape and dimensions of the welding roll must be kept within predetermined limits in order to obtain a good "cut-weld" between the sheets 31 and 32. The heated roller 21, according to the invention has lateral faces 147 and 148 which converge symmetrically toward the flat welding face 149. The unheated anvil roller 22, on the other hand, has a cylindrical outer face which is flat in cross section as at 150 and extends outwardly beyond the welding surface 149. The width of portion 150 is not critical, as long as it extends substantially at each side as shown.

Our experiments indicate that where the thickness of the individual sheets 31 or 32 of thermoplastic material is less than .005 inch, the width of welding face 149 should lie within the range from substantially one-eighth inch (⅛″) to one sixty-fourth inch (1/64″) and preferably of the order of one thirty-second inch (1/32″). Furthermore, we have found by experiment that the lateral faces 147 and 148 should converge at an angle of from 20° to 80°, and preferably of the order of 40°. This means that the lateral faces would make an angle of from 50° to 80°, and preferably of about 70°, with the plane of the material or the flat section 150.

If the width of surface 149 is greater than the specified limits, too large a portion of material is squeezed or extruded to form the seam 151 between layers 31 and 32. If the width of surface 149 is too small, insufficient extrusion and softening will take place.

Should surfaces 147 and 148 intersect the line 150 at too great an angle, i. e., too nearly at the perpendicular, there is a tendency for the softened material to climb these surfaces 147 and 148 and gum up the roller. Also the conduction of heat to surface 149 may be inadequate. On the other hand, too small an angle of intersection with line 150 would spread the welded portion and fail to produce a clean-cut seam. The lines of intersection of lateral faces 147 and 148 with peripheral face 149 should be stoned or ground so that they are free of burrs or imperfections.

By use of welding and anvil rollers 21 and 22 having the characteristics specified above, we are able to cut and weld the sheets 31 and 32 in a single operation without the use of separate devices for the cutting and welding operations. The advantages of such a mechanism in ease of handling, lower costs and efficiency of operation are clearly apparent.

It should be noted that current for the welding unit may be supplied by any suitable means, for example by a contact roller 153 on the unit and a conducting strip 154 on the frame of table 29.

*Summary*

The welding unit described in the foregoing specification offers obvious advantages and improvements over machines previously known in the art. Thus the provision of rotatable tensioning members and their adjustable mounting with respect to the welding rollers makes it possible to achieve any desired tensioning action on the layers of material to be joined. This action affects each layer independently so that there will be no tendency for one sheet to be wrinkled while the other one remains smooth. Furthermore, the angular mounting of the feed rolls behind the welding rollers and the arrangement of these rolls with outwardly diverging axes maintains the proper tension on the cut portion behind the welding rolls and thus assists in holding the material flat and in obtaining a flawless seam. The novel arrangement of cleaning means for the welding roller makes possible a more continuous use of such a welding unit with freedom from gumming and clogging of the apparatus by particles of the material being sealed. And finally, the particular shape and dimensions of the welding rollers make it possible to cut and weld the material in a single operation and provide a joint at least as strong as the original material.

Since various changes in the details of construction of the various parts may be readily made by persons skilled in the art without departure from the essential teachings of this specification, it is our intention that the present invention shall include all such changes and variations as fall within the scope and spirit of the following claims.

Now, therefore, we claim:

1. A device for fastening superimposed layers of sheet material comprising fastening means mounted for relative movement along said material, a plate against which said material is guided, said plate lying substantially in the plane of the material and being located ahead of the fastening means, said device including feeding means causing relative longitudinal movement of the material from the plate toward the fastening means, and a tensioning member engaging said material to hold it against said plate, said member being rotatably mounted on an axis parallel to the plane of said plate and material and having a surface providing slipping engagement with said material in a direction tending to smooth it and tension it laterally across said plate.

2. A device for fastening superimposed layers of flexible sheet material comprising a fastening member, feeding means providing longitudinal relative movement between said material and said member in the plane of the material for action of said member on successive portions of the material, and a tensioning roller mounted ahead of said fastening member and movable with the latter, said roller having a surface providing frictional sliding engagement across the material to smooth and tension it for action of the fastening member, before the material is engaged by said member, and said feeding means providing relative movement of the material from the tensioning member toward the fastening member.

3. A device according to claim 2 in which said roller consists of a rotatable brush.

4. A device according to claim 3 in which said roller rotates on an axis parallel to the plane of the material and angularly disposed with respect to the direction of relative movement of the material and member.

5. A device for continuously joining superimposed layers of flexible sheet material while said device and material are moved relatively to each other along a predetermined path for action of the device on successive portions of the material and while said layers are kept in alignment, which comprises fastening means for joining said layers, and a tensioning roller engaging at least one of said layers at a point before said layers reach said fastening means to smooth and tension said layer for action of said means, the relative location of the fastening means and tensioning roller along said path requiring relative feeding movement of the material from the tensioning roller toward the fastening means.

6. A device according to claim 5 in which said roller rotates on an axis disposed at an acute angle to the direction of relative movement between the device and material.

7. A device according to claim 5 having a feed roller engaging the material after operation of said fastening means, said feed roller being mounted on an axis disposed at an angle to the transverse axis of the device.

8. A tensioning device for engaging and smoothing superimposed sheets of flexible material while said sheets are being fed toward a welding unit and before the sheets reach said unit, said device comprising a brush rotatably mounted on an axis parallel to the plane of said sheets and having peripheral engagement with one of said sheets, a guide plate against which said sheet is held and smoothed by said brush, and feeding means causing relative movement of the material with respect to the plate and brush along a given path in the plane of the plate and in a direction from the plate and brush toward the welding unit, with said sheet of the material being fed between the brush and plate and being tensioned thereby in another direction.

9. A tensioning device for engaging and smoothing the edges of a pair of superimposed sheets of flexible material while said sheets are being fed toward a welding unit, said device comprising a guide plate in the plane of the sheets and located between said sheets, a rotary tensioning member on each side of said plate with one sheet of material engaged between each tensioning member and the corresponding surface of the plate, said tensioning members each having a peripheral portion in slipping engagement with the respective sheets thereby holding them smoothly against the plate and tensioning the sheets along the plane of the plate in a given direction, and feeding means causing relative movement of the sheets from the plate and brush toward such welding unit along a path lying in the plane of the plate and extending in another direction.

10. A tensioning device according to claim 9 in which the axis of rotation of each tensioning member is parallel to the plate and is angularly disposed with respect to a line extending transversely of the direction of feed.

11. Welding apparatus for joining superimposed sheets of flexible thermoplastic material while said apparatus and material are moved relatively to each other along the longitudinal axis of the apparatus and while said sheets are held in superimposed alignment at one side of said apparatus to resist lateral displacement along the transverse axis of the apparatus, said apparatus comprising a pair of cooperating welding members between which the superimposed layers of material are fed and seamed together, a guide plate located ahead of the welding members in the plane of said sheets, a tensioning member rotatably mounted on one side of said plate having its periphery in sliding engagement with at least one sheet, the sheet having its opposite surfaces engaged between said tensioning member and plate, means rotating the tensioning member in the direction in which that portion of its periphery adjacent the plate moves away from the side of the apparatus at which the sheets are held in alignment, thereby holding said sheet smoothly against the plate and tensioning said sheet in advance of said welding members, and a feed roller engaging the sheet behind said welding members to tension the sheet longitudinally and rearwardly of said members, the location of the plate, welding member and feed roller requiring relative feeding movement of the material from the plate and tensioning roller to the welding members and then to the feed roller.

12. Apparatus according to claim 11 having a tensioning member on each side of said plate with a layer of material engaged on its opposite surfaces between each tensioning member and the corresponding surface of the plate.

13. Apparatus according to claim 11 in which the axis of rotation of said tensioning member is angularly disposed with reference to the longitudinal axis of the apparatus.

14. Apparatus according to claim 11 in which the axis of rotation of said tensioning member is angularly disposed with reference to both the longitudinal and transverse axis of the apparatus.

15. Apparatus according to claim 11 in which said tensioning member is mounted for universal angular adjustment of its axis of rotation with reference to the axes of the apparatus.

16. Apparatus according to claim 11 in which the axis of rotation of said feed roller angularly intersects the transverse axis of the apparatus.

17. Apparatus according to claim 11 having a second feed roller cooperating with the first feed roller to feed the material therebetween, the axes of rotation of said rollers lying in a common plane angularly disposed with reference to the transverse axis of the apparatus and said axes converging slightly on each other in a direction toward the weld line of the material.

18. A welding device for thermoplastic material comprising a heated welding roller the periphery of which engages said material, and a coating scraper engaging said roller before the roller engages the material, said coating scraper consisting of polymerized tetrafluoroethylene, the engagement of the scraper providing a thin coating of said polymerized tetrafluoroethylene on the roller and thereby minimizing adhesion of the thermoplastic material to the roller.

19. A welding device for thermoplastic material comprising a heated welding roller, the periphery of which engages said material, cleaning means engaging a portion of said periphery and thereby removing particles of adhering material after said portion has engaged the material, a coating scraper engaging said peripheral portion after the peripheral portion has passed said cleaning means and before such peripheral portion again engages the material, said coating scraper consisting of polymerized tetrafluoroethylene, and means for rotating the welding roller in the direction in which each portion of its periphery successively engages the cleaning means, the coating scraper and the material in that order.

20. A welding device according to claim 19, having an additional scraper of polymerized tetrafluoroethylene engaging said peripheral portion immediately after said portion has engaged the thermoplastic material and before such portion reaches the cleaning means.

21. Welding apparatus for joining the edges of superimposed sheets of flexible thermoplastic material while said apparatus and material are moved relatively to each other along the longitudinal axis of the apparatus, said apparatus comprising a guide plate located in the plane of said sheets, anchoring means at one edge of said plate for holding the main body of at least one of said sheets in alignment substantially in the plane of the plate and resisting lateral displacement of said sheet across the plate along the transverse axis of the apparatus, a tensioning member rotatably mounted at one surface of the plate and having a surface adapted for slipping engagement with at least said one sheet to hold said sheets smoothly against the plate, said tensioning member having its axis of rotation parallel to the plate and angularly disposed with respect to the transverse axis of the apparatus, means for rotating the tensioning member in a direction in which the surface of the member nearest the plate moves away from the holding means and thereby tends to pull at least said one sheet transversely away from said holding means and maintain it in smoothly tensioned position, and a welding member engaging and securing the superimposed sheets after they have been smoothed by the tensioning member, the tensioning member being located ahead of the welding member and thereby requiring relative longitudinal movement of the material from the tensioning member toward the welding member during operation of the apparatus.

KERMIT F. JOHNSON.
FRANK J. LA MERE.
OTTO C. WINZEN.

References Cited in the file of this patent

UNITED STATES PATENTS

| Number | Name | Date |
| --- | --- | --- |
| 2,117,452 | Robinson | May 17, 1938 |
| 2,214,007 | Ziegler | Sept. 10, 1940 |
| 2,258,240 | Davies | Oct. 7, 1941 |
| 2,298,531 | Fourness | Oct. 13, 1942 |
| 2,336,962 | Salfisberg | Dec. 14, 1943 |
| 2,367,490 | Ducklo | Jan. 16, 1945 |
| 2,397,838 | Chavannes | Apr. 2, 1946 |
| 2,425,388 | Oestricher | Aug. 12, 1947 |
| 2,443,327 | Salfisberg | June 15, 1948 |
| 2,487,149 | Leguillon | Nov. 8, 1949 |
| 2,516,280 | Welch | July 25, 1950 |